United States Patent [19]

Grant et al.

[11] Patent Number: 4,891,720
[45] Date of Patent: Jan. 2, 1990

[54] BELT DRIVE SYSTEM FOR A MAGNETIC TAPE CASSETTE TRANSPORT/ACCESSOR

[75] Inventors: Frederic F. Grant, Bellflower; John P. Grant, Downey, both of Calif.

[73] Assignee: Datatape Incorporated, Pasedena, Calif.

[21] Appl. No.: 285,832

[22] Filed: Dec. 16, 1988

[51] Int. Cl.4 ............................................. G11B 15/68
[52] U.S. Cl. ........................................ 360/92; 369/36
[58] Field of Search ................ 360/92, 98.04–98.06; 369/34, 36–39; 414/273, 276, 277, 280–283, 659–663

[56] References Cited

U.S. PATENT DOCUMENTS

| | | |
|---|---|---|
| 3,557,977 | 1/1971 | Atwater . |
| 4,113,119 | 9/1978 | Brown et al. . |
| 4,507,044 | 3/1985 | Hutchins et al. . |
| 4,566,346 | 1/1986 | Petiteabl . |
| 4,614,474 | 9/1986 | Sudo . |
| 4,685,095 | 8/1987 | Rudy ..................................... 369/36 |

*Primary Examiner*—A. J. Heinz
*Attorney, Agent, or Firm*—William F. Noval

[57] ABSTRACT

Disclosed is magnetic tape cassette transport apparatus for use with a magnetic tape cassette storage and utilization system. Magnetic tape cassettes are transported between locations in the system by means of a cassette transport/accessor assembly, which is actuated by a belt drive system using stationary drive motors. This drive system eliminates the need to mount drive motors on the transport assembly, thus effecting a lighter weight, less complex assembly. The transport/accessor assembly includes two vertical rails rigidly mounted on upper and lower wheel carriages which travel on spaced horizontal rails adjacent to the cassette storage and utilization system. An accessor platform travels vertically on the vertical rails. The accessor platform supports a pair of cassette accessor assemblies which insert and extract a cassette from a location in the cassette storage and utilization system. The power for driving the cassette transporter/accessor assembly is provided by stationary motors coupled to the transport/accessor assembly through sprocket driven, high-yield stainless steel belts. Separate motor and belt drive systems provide selective movement of the transport/accessor assembly in horizontal, vertical and lateral directions.

7 Claims, 9 Drawing Sheets

TABLE

| TRAVEL | M-X | M-Y | M-Z | 301 | 302 | 303 | 304 | 305 | 306 | 307 |
|--------|-----|-----|-----|-----|-----|-----|-----|-----|-----|-----|
| X | CW | O | O | <u>CW</u> | CCW | O | <u>CW</u> | CCW | O | <u>CW</u> |
| Y | O | CW | O | O | O | CW | <u>CW</u> | CCW | O | <u>CW</u> |
| Z | O | O | CW | O | O | O | O | O | CW | <u>CW</u> |

FIG. 10B

BELT DRIVE SYSTEM FOR A MAGNETIC TAPE CASSETTE TRANSPORT/ACCESSOR

BACKGROUND OF THE INVENTION

This invention relates in general to magnetic tape cassette transport apparatus, and, more particularly, to a magnetic tape cassette transport/accessor assembly, which is movable in horizontal, vertical and lateral directions by means of a belt drive system, which eliminates the need to mount drive motors on the transport/accessor assembly.

In applications in which a large amount of information is stored on electronic media (such as the storage of digital information on a plurality of magnetic tape cassettes), it is often desirable that each unit of storage (e.g., magnetic tape cassette), be accessed in a minimum amount of time. For example, it is desirable to minimize the time required to change over from one cassette to another cassette used in a magnetic tape record/reproduce device. Where the cassette storage system includes a large number of cassette storage compartments, it is also desirable that the cassette be transported between a storage compartment and a record/reproduce device, in a manner which minimizes damage to the cassette through rough or jerky movements in the cassette transport device. Thus, a smooth, gentle acceleration and deceleration of the cassette transport assembly is desired.

Various arrangements have been proposed to actuate a transport assembly to transport an object between spaced locations in a storage system. The simplest type of arrangement uses manual power for actuation of the transport system. (See: U.S. Pat. No. 4,113,119, issued Sept. 12, 1978, entitled APPARATUS FOR LOADING ARTICLES ONTO VERTICALLY SPACED HORIZONTALLY DISPOSED SHELVES.) Although such an arrangement is relatively inexpensive, it is disadvantageous because it is not readily adaptable for use as an automatic storage system. In order to ameliorate this deficiency in manually operated transport systems, it has been proposed to use motors in order to actuate the transport assembly. Typically, at least one or more of the actuating motors are mounted on the transport assembly itself. (See, for example, U.S. Pat. No. 3,557,977, issued Jan. 26, 1971, entitled LOAD DETECTING DEVICE FOR WAREHOUSING SYSTEM, and U.S. Pat. No. 4,614,474, issued Sept. 30, 1986, entitled DEVICE FOR EXCHANGING DISKS.) However, drive motors and drive motor supports, add considerable weight to the transport assembly, thus increasing the stresses on the transport assembly drive and on the transport assembly load-bearing components. Moreover, reliability is reduced and maintenance is made more difficult.

It has been proposed to use a belt or cable system to eliminate mounting one or more motors on moving components of the transport assembly. Thus, for example, in U.S. Pat. No. 4,507,044, issued Mar. 26, 1985, entitled ROBOT AND CONTROL SYSTEM, and U.S. Pat. No. 4,566,346, issued Jan. 28, 1986, entitled AUTOMATED TOOL MANIPULATING STRUCTURE WITH X-Y MOVEMENT INCLUDING A BELT AND PULLEY DRIVE ARRANGEMENT, there are disclosed arrangements in which x and y direction drive motors are not mounted on the member which is moved in the x and y directions. Although these arrangements may be suitable for the purposes for which they were intended, they do not solve the problem of actuating a transport assembly which is movable in three mutually orthogonal directions. Thus, in the latter patent, the x-y drive motors are mounted on a rotating table which is driven by a third motor which is fixedly mounted. Thus, the rotating table is weighted down by the x-y drive motors and motor mounts, requiring a heavier duty bearing to support the rotating table and a larger motor to drive it.

SUMMARY OF THE INVENTION

According to the present invention, there is provided a drive for a magnetic tape cassette transport assembly which obviates the disadvantages of the prior art. According to an aspect of the present invention, a magnetic tape cassette transport/accessor assembly and drive is provided, in which the weight of the transport/accessor assembly is minimized, thus minimizing the stresses in the transport/accessor assembly drive and load-bearing components. This minimized stress results in improved reliability and maintainability of the transport assembly system.

According to a feature of the present invention, a magnetic tape cassette storage system, includes a plurality of magnetic tape cassette storage compartments, which are accessed by a cassette transport/accessor assembly. The transport/accessor assembly is automatically moved in horizontal, vertical and lateral directions by a sprocket driven, belt drive system. The sprocket driven, belt drive system includes a stationary motor and sprocket driven belt coupled to the transport/accessor assembly for each movement of the assembly in the horizontal, vertical and lateral directions.

DESCRIPTION OF THE DRAWINGS

In the detailed description of the preferred embodiments of the invention presented below, reference is made to the accompanying drawings in which like numbers represent like elements.

FIGS. 3A and 4 are perspective views of components of the apparatus of FIGS. 2A and 2B, while

DESCRIPTION OF THE PREFERRED EMBODIMENTS

In the following description of preferred embodiments of the present invention, the belt drive system will be described as used with a magnetic tape cassette transport/accessor system used in conjunction with magnetic tape cassette storage and record/reproduce apparatus. It will be understood, however, that the belt drive system of the present invention may also be used with transport systems for other types of electronic media, such as optical disks.

Figure 1:
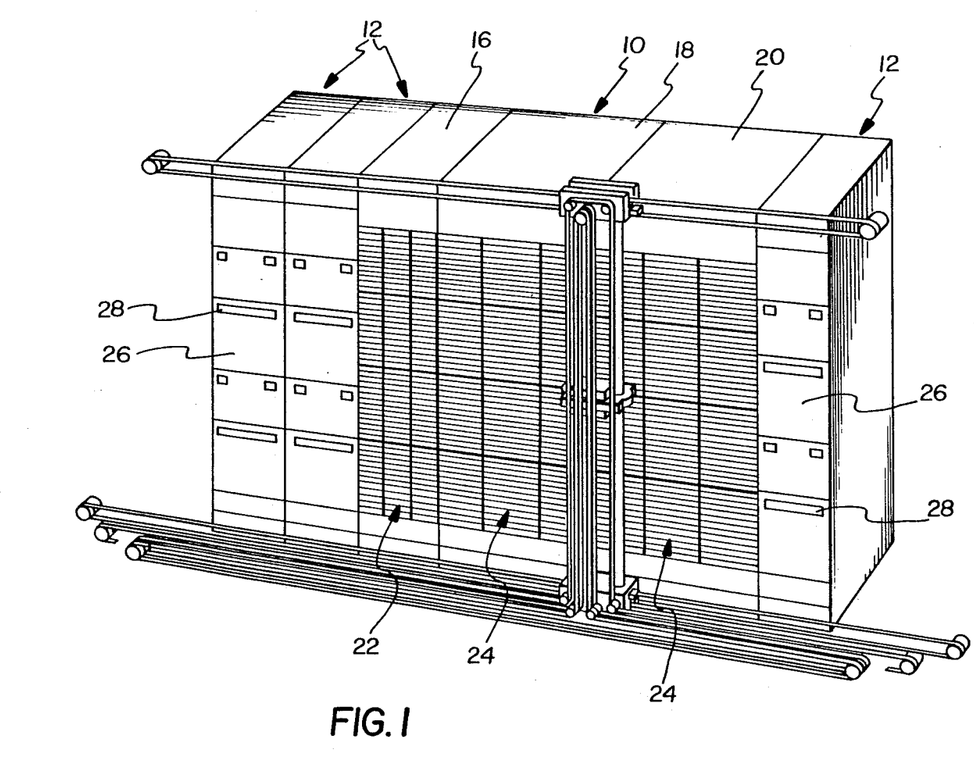
FIG. 1 is a perspective, diagrammatic view of a magnetic tape cassette storage and utilization system incorporating an embodiment of the present invention.

Referring now to FIG. 1, there is shown magnetic tape cassette storage system 10, magnetic tape record/reproduce modules 12 and magnetic tape cassette transport/accessor assembly 14. Cassette storage system 10 includes side-by-side storage modules 16, 18 and 20. Storage module 16, for example, has a matrix of small cassette storage compartments 22 for storing small magnetic tape cassettes. Storage modules 18 and 20 have a matrix of large cassette storage compartments 24 for storing large magnetic tape cassettes. Each of storage modules 16, 18 and 20 comprise a matrix of columns and rows of cassette storage compartments to store a large number of magnetic tape cassettes of a given size.

Each record/reproduce module 12 includes two magnetic tape record/reproduce devices 26, which include a cassette loading slot 28, through which a magnetic tape cassette is inserted into and extracted from device 26.

Figure 2A:
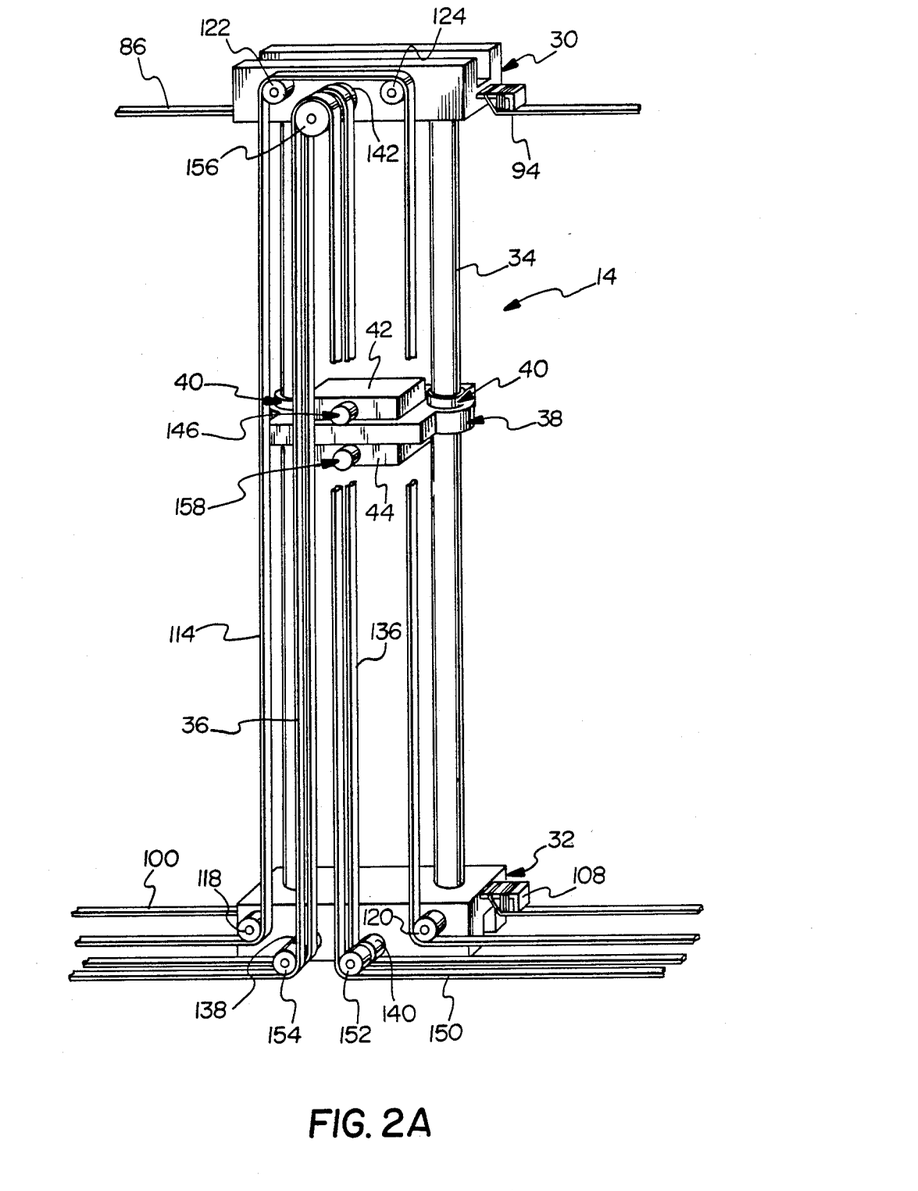
FIGS. 2A and 2B are, respectively, front perspective and diagrammatic views of a cassette transport/accesor assembly including an embodiment of the belt drive system of the present invention.

Referring now to FIGS. 2A-4, there will be described in greater detail the cassette transport/accessor assembly 14 including an embodiment of the belt drive system of the present invention. As shown in FIG. 2A, cassette transport/ accessor assembly 14 includes, upper carriage 30, lower carriage 32, vertical rails 34 and 36, rigidly mounted on carriages 30 and 32, and accessor platform 38, which is mounted for vertical movement on vertical rails 34 and 36 by means of bearings 40. Accessor platform 38 carries two magnetic tape cassette accessors 42 and 44.

Figure 3A:
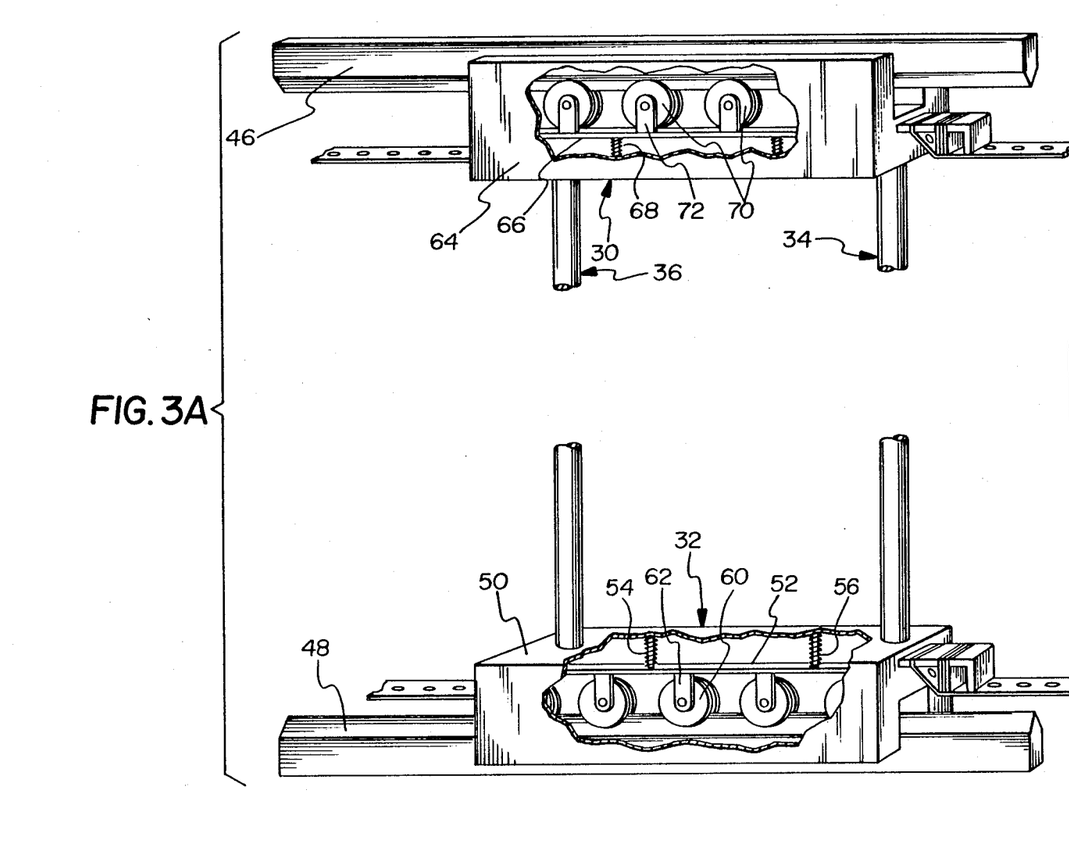
Figure 3B:
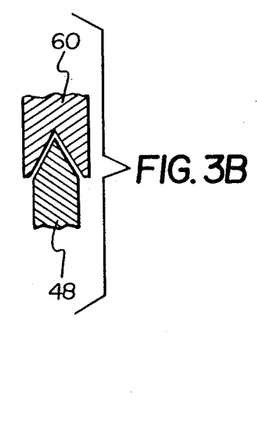
FIG. 3B is a partial, sectional view of a segment of the components shown in FIG. 3A.

As shown in FIG. 3A, upper carriage 30 travels on V-shaped upper rail 46 and lower carriage 32 travels on V-shaped lower rail 48. Rails 46 and 48 are parallel and are respectively located at the top and bottom of modules 12, 16, 18 and 20. Rails 46 and 48 extend the length of modules 12, 16, 18, 20. Carriage 32 includes a housing 50 mounted on wheel-carrying member 52 by means of springs 54 and 56. Member 52 rotatably mounts a plurality of V-shaped wheels 60 by means of brackets 62. As shown in FIG. 3B, rail 48 and wheels 60 have complementary V shapes.

Upper carriage 30 is similar in construction to lower carriage 32. Carriage 30 includes housing 64 mounted on wheel-carrying member 66 by means of springs 68. Member 66 supports a plurality of V-shaped wheels 70 by means of wheel brackets 72.

According to the present invention, a sprocket driven belt drive system drives the cassette transport/accessor assembly 14 in three mutually orthogonal directions, i.e. horizontal, vertical and lateral directions. By eliminating drive motor and drive motor supports on the cassette transport/accessor assembly, the weight of the assembly is kept to a minimum. Such weight reduction minimizes stresses in the transport/accessor assembly and in load-bearing components. This minimized stress is directly translatable into improved reliability and maintainability. Moreover, since the need to supply electrical power to motors which are mounted on moving components is eliminated, there are also eliminated moving electrical conductors and/or electrical power transmission elements, such as slip rings.

Figure 2B:
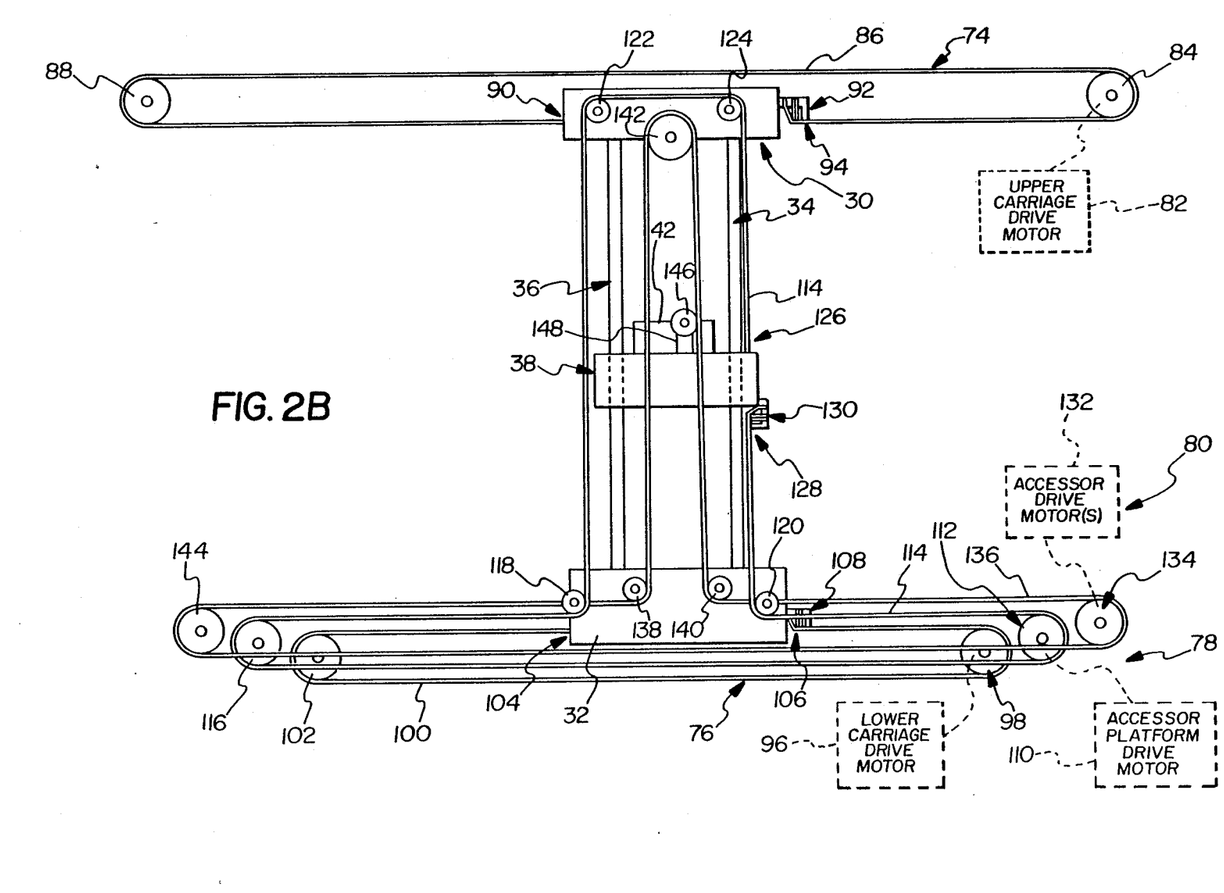

According to the embodiment of the belt drive system of the present invention shown in FIGS. 2A and 2B, there is provided an upper carriage belt drive 74, a lower carriage belt drive 76, accessor platform belt drive 78 and accessor belt drive 80. Upper and lower carriage belt drives 74 and 76 provide horizontal movement to the transport/accessor assembly and cause carriages 30 and 32 to travel along rails 46 and 48, respectively. Drives 74 and 76 are driven synchronously so that the assembly is not subjected to any tilting forces. Accessor platform belt drive 78 drives accessor platform 38 vertically along rails 34 and 36. Accessor belt drive 80 drives the accessor or accessors on accessor platform 38 laterally to insert and extract magnetic tape cassettes from the storage compartments of cassette storage system 10 and from the cassette loading slots of record/reproduce modules 12.

Upper carriage belt drive 74 includes an upper carriage drive motor 82 (FIG. 2A) connected to sprocket 84. Sprocket 84 drives perforated stainless steel belt 86. Belt 86 is trained about sprocket pulley 88 and is fixedly attached at one end 90 to upper carriage 30 and at its other end 92 to carriage 90 by means of spring dampener assembly 94. Lower carriage belt drive 76 includes lower carriage drive motor 96 conencted to sprocket 98. Sprocket 98 drives perforated stainless steel belt 100 which is trained around sprocket pulley 102. Belt 100 is fixedly attached to lower carriage 32 at one end 104 and at the other end 106 by means of spring dampener assembly 108.

Accessor platform belt drive 78 includes accessor platform drive motor 110 connected to sprocket 112. Sprocket 112 drives perforated, stainless steel belt 114 which is also trained about sprocket pulley 116. Belt 114 is also trained about sprocket pulleys 118 and 120 mounted on lower carriage 32 and about sprocket pulleys 122 and 124 mounted on upper carriage 30. Belt 114 is fixedly attached at one end 126 to accessor platform 38 and at its other end 128 to accessor platform 38 by means of spring dampener assembly 130.

As shown diagrammatically in FIG. 2B, accessor belt drive 80 includes accessor drive motor 132 which is connected to sprocket 134. Sprocket 134 drives perforated stainless steel belt 136. Belt 136 is trained about sprocket pulleys 138 and 140 rotatably mounted on lower carriage 32, about sprocket pulley 142 rotatably mounted on upper carriage 30 and about sprocket pulley 144. Belt 136 engages a sprocket 146 which is mounted on accessor platform 38 by means of bracket 148.

A second accessor belt drive is provided for driving accessor 44 in a lateral direction. (See: FIG. 2A) The second accessor belt drive includes a perforated stainless steel belt 150 driven by an accessor drive motor (not shown). Belt 150 is trained about sprocket pulleys 152 and 154 rotatably mounted on lower carriage 32 and about sprocket pulley 156 rotatably mounted on upper carriage 30. Belt 150 engages sprocket 158 mounted on accessor platform 38. Belt 150 drives accessor 44 to travel in a lateral direction to insert and extract a magnetic tape cassette. Motors 82, 96, 110 and 132 are preferably brushless direct current motors.

Figure 5:
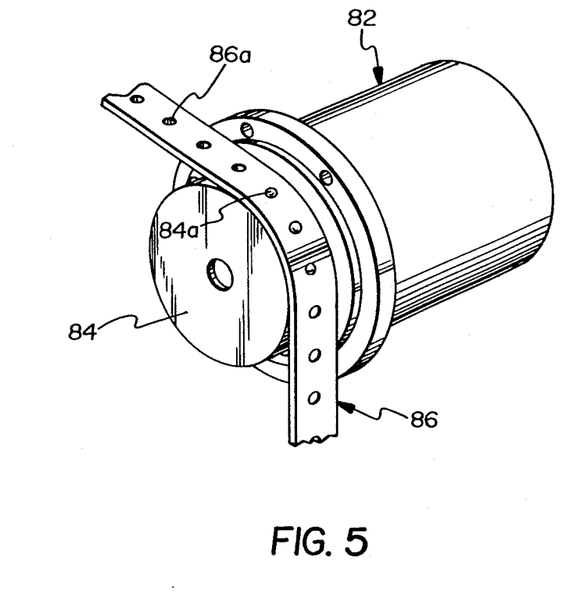
FIG. 5 is a perspective view showing, in detail, a motor-sprocket-belt drive used in the apparatus shown in FIGS. 2A and 2B.

FIG. 5 shows a perspective view of upper carriage drive motor 82 connected to sprocket 84. Belt 86 has perforations (sprocket holes) 86a which are engaged by sprocket teeth 84a of sprocket 84. Drive belts 86, 100, 114, 136 and 150 are high yield, stainless steel belts. The stress in the stainless steel belts to move their respective loads is very low when compared to the strength of the belt material. The belts are installed with low tension in order that the friction force between a drive belt and a sprocket pulley is not sufficient to drive the respective load in acceleration. Thus, the sprocket teeth of the drive sprocket will drive the belt unaided and unopposed by belt friction.

Figures 6A, 6B:
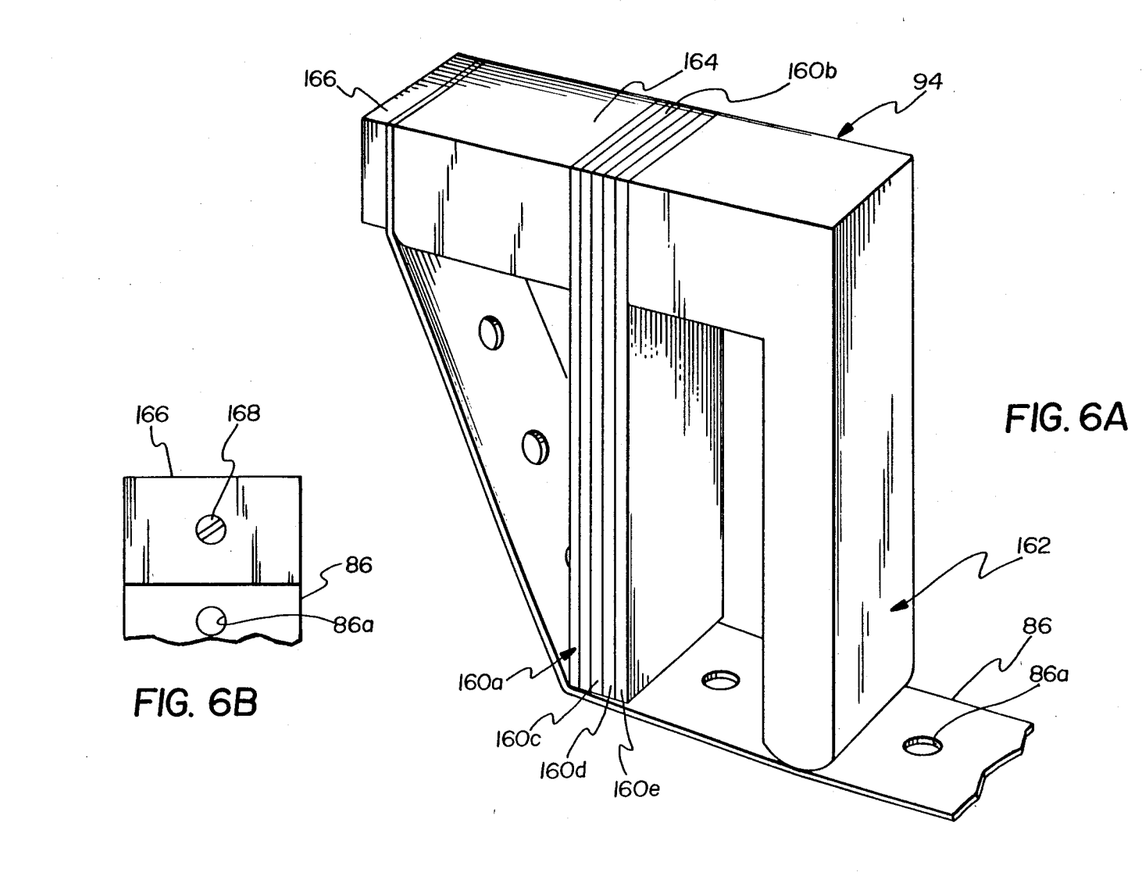
FIGS. 6A and 6B are views of a spring-dampener assembly used in the apparatus shown in FIGS. 2A and 2B.

Spring dampener assemblies 94, 106 and 130 provide smooth acceleration and decleration of the respective assemblies driven by the belts to which they are attached. The spring dampener assemblies also provide compensation for differential thermal expansion and contraction. As shown in FIGS. 6A and 6B, spring dampener assembly 94 includes a plurality of stacked leaf springs 160 and L-shaped dampener 162. Leaf springs 160, L-shaped dampener 162 and member 164 are assembled together by means of suitable fasteners (not shown). Belt 86 is secured to member 164 by means of screw 168 which clamps the end of belt 86 between members 164 and 166. Belt 86 is bent around springs 160 and dampener 162. Spring dampener assembly 94 may be secured to upper carriage 30 by any well known means.

Figure 4:
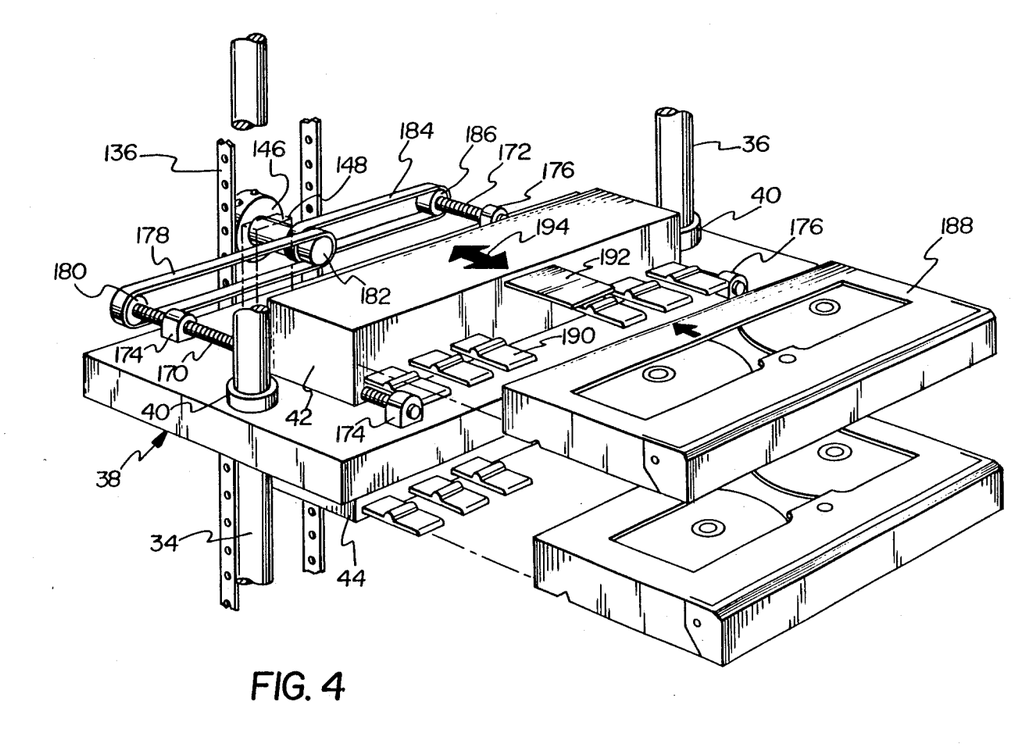

Referring now to FIG. 4, there is shown in greater detail, cassette accessor assemblies 42 and 44. Cassette accessor 42 is mounted for lateral movement on accessor platform 38 by means of lead screws 170 and 172, respectively mounted on platform 38 by means of brackets 174 and 176.

Rotation of sprocket 146 by drive belt 136 rotates screws 170 and 172 by means of belts 178 and 184. Belt 178 is trained about a pulley 180 which is mounted on screw 170, and also about a shaft 182 upon which sprocket 146 is mounted. Belt 184 is trained about a pulley 186 which is mounted on screw 172 and also about shaft 182.

Accessor 44 is driven in a lateral direction by a similar screw assembly (not shown).

A magnetic tape cassette 188 is gripped by lower fingers 190 and upper finger 192. Reference is made to copending U.S. patent application Ser. No. 286,403, filed 12-16-88, entitled ACCESSOR FOR A MAGNETIC TAPE CASSETTE, for a more detailed description of the operation of accessors 42 and 44. In general, an accessor is moved into and out of a storage compartment or a cassette loading slot to insert or extract a magnetic tape cassette. The fingers 190 and 192 are locked and unlocked by the motion of the accessor in a lateral direction (as shown by arrow 194).

The cassette transport/accessor assembly 14 physically transports any size magnetic tape cassette between any cassette storage compartment 22 or 24 in cassette storage system 10, and any other storage compartment in system 10 or a cassette loading slot of any record/reproduce device 26 in modules 12. In actuating the upper and lower carriage drive motors 82 and 96, accessor platform drive motor 110 and accessor drive motor 132, the accessor platform may be moved horizontally, vertically, or diagonally to position the accessor platform at any location for inserting or extracting a magnetic tape cassette. After the accessor platform 38 has been properly positioned, accessor drive motor 132 is actuated to move the accessor 42 (or 44) laterally to extract or insert a magnetic tape cassette. By providing two accessors 42 and 44 on accessor platform 38, one accessor may be used to extract a cassette from a record/reproduce device, while the other accessor inserts the next magnetic tape cassette to be used by the record/reproduce device. Thus, cassette exchange is effected in a minimum amount of time. During the time that a magnetic tape cassette is being loaded, threaded and played (or recorded) in a magnetic tape record/reproduce device, the transport/accessor assembly 14 travel to deposit the last used magnetic tape cassette in its storage compartment and to access another magnetic tape cassette to be used by a record/reproduce unit.

Figure 7:
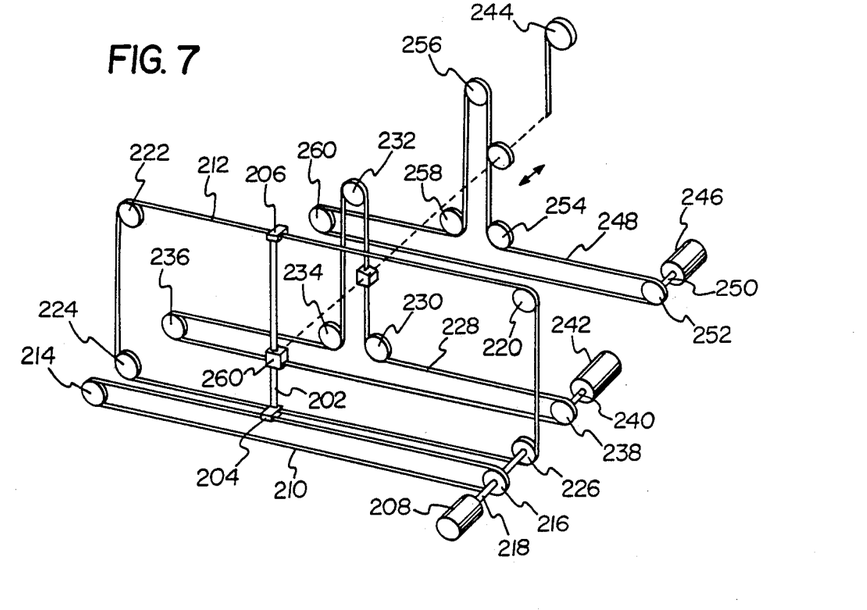
FIG. 7 is an alternate embodiment of a belt drive system according to the present invention.

Referring now to FIG. 7, there is shown another embodiment of belt drive system according to the present invention. (Although the components of this embodiment correspond to the components of the embodiment described above, new numbers will be used to describe this embodiment.) Diagrammatically illustrated is an arrangement utilizing three motors to produce motion of a cassette transport/accessor in horizontal, vertical and lateral directions. As shown, a cassette accessor platform 200 is mounted for vertical movement on vertical rail 202 mounted between lower carriage 204 and upper carriage 206. A single horizontal drive motor 208 drives belts 210 and 212 respectively connected to lower and upper carriages 204 and 206. Belt 210 is trained about pulley 214 and drive pulley 216 which is mounted on drive shaft 218. Belt 212 is trained about pulleys 220, 222, 224 and drive pulley 226 which is also mounted on drive shaft 218.

Vertical movement of accessor platform 200 on rail 202 is effected by drive belt 228 which is trained about pulleys 230, 232, 234, 236 and drive pulley 238 which is mounted on drive shaft 240 of vertical drive motor 242. A balance spring 244 is connected to accessor platform 200 to counterbalance the weight of the accessor platform 200 and the cassette accessor(s) mounted thereon. Spring 244 is a constant force spring.

The lateral motion of an accessor on accessor platform 200 is provided by lateral drive motor 246 which drives a fourth belt 248 through drive shaft 250 and drive pulley 252. Belt 248 is also trained about pulleys 254, 256, 258 and 260.

Motors 208, 242 and 246 are provided with encoders to effect coordination of the movement of accessor platform 200 and the accessors mounted thereon. The vertical travel of accessor platform 200 is controlled by the difference between the vertical motor drive encoder and the horizontal drive motor encoder. Thus, to hold accessor 200 in a given vertical position, the vertical drive motor 242 must rotate through the same angle as the angle through which horizontal drive motor 208 rotates. In similar fashion, the lateral drive motor 246 encoder is synchronized with the vertical drive motor 242 encoder to control power input to the cassette accessor.

Figures 8, 9:
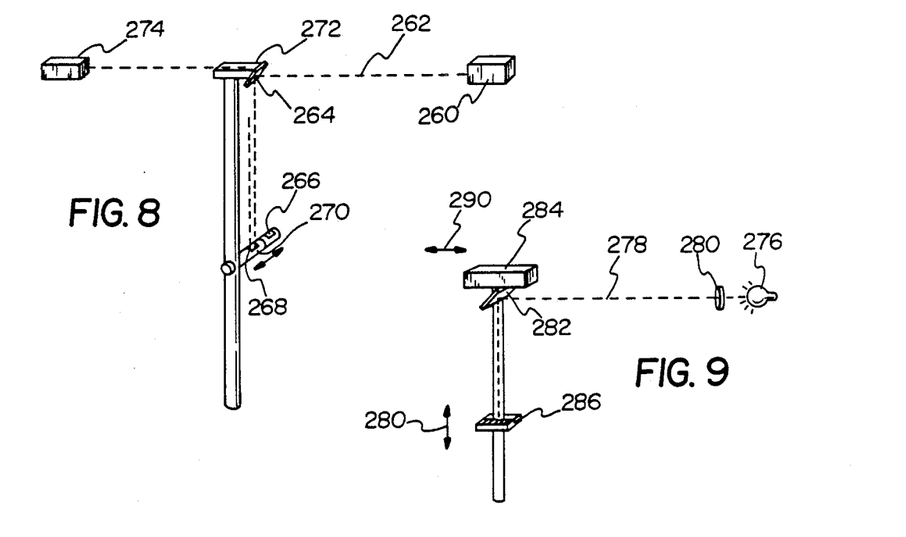
FIGS. 8 and 9 are diagrammatic views of electro-optical systems which may be used with the apparatus of FIGS. 2A and 2B.

Referring now to FIG. 8, there is shown an electro-optical, parallel light system for sensing the position of an accessor. As shown, laser 260 emits a beam 262 of laser light which strikes a 45° oriented mirror 264. Mirror 264 directs the beam downward to strike one of two mirrors 256 or 268 mounted on accessor member 270. As the accessor is in or out, the appropriate mirror 266 or 268 will reflect and modify the laser beam in different ways to make the beam identify which mirror reflected it. Beam splitter 272 directs the reflected beam to a sensor 274. Sensor 274 and laser 260 are mounted in a fixed position, while mirror 264 and beam splitter 272 are mounted on the upper carriage of the cassette transport/accessor assembly.

Referring to FIG. 9, there is shown an electro-optical system for delivering electrical power to the accessor platform. A light source, such as bulb 276, emits a beam 278 which is collimated by lens 280 to reflect from a mirror 282 mounted on upper carriage 284. A solar cell array 286 mounted on the accessor platform receives the light emitted by light source 276. Solar cell array 286 will always receive light as the accessor platform is moved either in the vertical direction indicated by arrows 288 or in the horizontal direction as indicated by arrows 290.

Figure 10A:
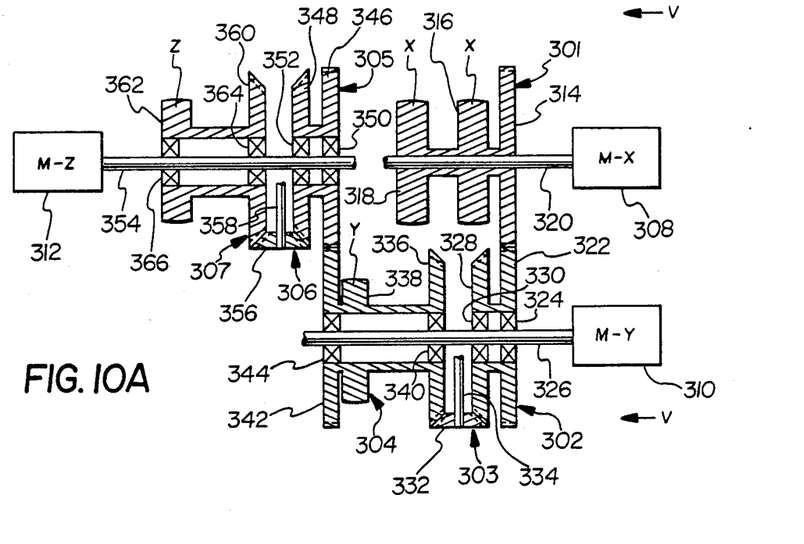
FIGS. 10A and 10B are respectively a diagrammatic view of another embodiment of the present invention and a table for illustrating the operation of the embodiment of FIG. 10A.
Figure 10B:
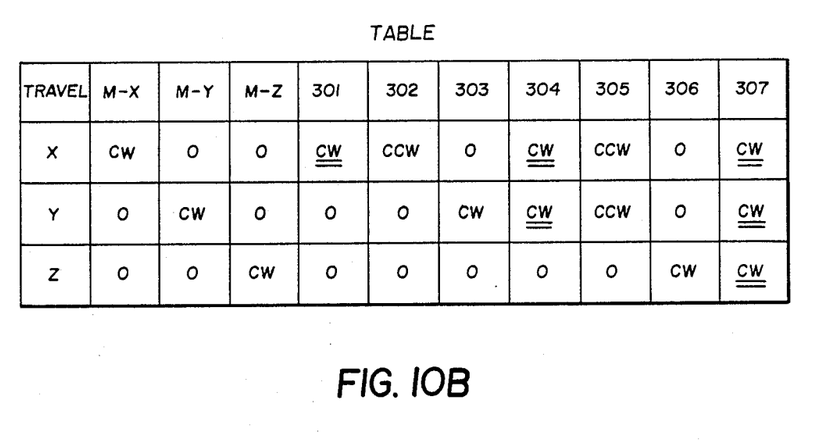

Referring now to FIGS. 10A and 10B, there will be described an alternate drive system for the belt drive system of the present invention. As shown in FIG. 10A, drive 300 includes rotating assemblies 301–307 and high reduction gear motors 308 (M-X), 310 (M-Y) and 312 (M-Z). Motors 308, 310, 312 act as brakes when not powered. Motor 308 causes an X (horizontal) motion of the transport/accessor assembly when powered, motor 310 causes a Y (vertical) motion of such assembly when powered, and motor 312 causes a Z (laterl) motion when powered.

Assembly 301 includes gear 314, X-motion pulleys 316 and 318 keyed to shaft 320 of motor 308. Assembly 302 includes gear 322 mounted on bearing 324 on shaft 326 of motor 310; and gear 328 mounted on bearing 330 on shaft 326. Gear 322 meshes with gear 314. Assembly 303 includes miter gear 332 mounted for rotation on shaft 334 which rotates with shaft 326. Assembly 304 includes gear 336 and Y-motion pulley 338 mounted on bearing 340 on shaft 326, and gear 342 mounted on bearing 344 on shaft 326. Gear 336 meshes miter gear 332.

Assembly 305 includes gears 346 and 348 mounted on bearing 350 and 352 on shaft 354 of motor 312. Gear 346 meshes with gear 343. Assembly 306 includes miter gear 356 mounted on shaft 358 which rotates with shaft 354. Assembly 307 includes gear 360 and Z-motion pulley 362 mounted on bearings 364 and 366 on shaft 354. Gear 360 meshes with gear 356.

Operation of drive 300 is illustrated by reference to FIG. 10B. Assemblies 303 and 306 rotate at half the rotational speed as assembly 301 as driven by a given motor voltage of motor 308. The designations of the Table of FIG. 10B relate to the apparatus shown in FIG. 10A. The rotation directions are viewed in the direction of arrows V of FIG. 10A. Rotation is designated as "O" for no rotation, "CW" for clockwise rotation, and "CCW" for counterclockwise rotation. Energizing M-X motor 308, causes pulleys 316, 318, Y pulley 338 and Z pulley 362 to rotate in the same direction as motor 308. Energizing M-Y motor 310, causes Y pulley 338 and Z pulley 362 to rotate in the same direction as motor 310 and leaves Y pulleys 316, 318 to remain stationary. Energizing M-Z motor 312, causes Z pulley 362 to rotate in the same direction as motor 312. If both M-X motor 308 and M-Y motor 310 are energized, the transport/accessor assembly will travel diagonally at an angle dependent on he relative voltages applied respectively to the two motors.

A second set of assemblies 305, 306, 307 and motor 312 may be added parallel to the first such set, to actuate a second accessor on the transport/accessor assembly.

The invention has been described above in detail with respect to preferred embodiments thereof, but it will be understood that variations and modifications can be effected within the spirit and scope of the invention.

What is claimed is:

1. For use with magnetic tape cassette storage and utilization apparatus, wherein a magnetic tape cassette is stored and/or utilized in at least two separate locations, the invention comprising:
   magnetic tape cassette accessor means for accessing a magnetic tape cassette at said two locations of said cassette storage and utilization apparatus;
   transport means for transporting said accessor means in first, second and third mutually orthogonal directions;
   first belt drive means coupled to said transport means for causing said accessor means to travel in said first direction, said first belt drive means including a first perforated belt assembly coupled to said transport means and first stationary sprocket motor drive means for driving said first belt assembly;
   second belt drive means coupled to said transporting means for causing said accessor means to travel in said second direction, said second belt drive means including a second perforated belt assembly coupled to said transport means and second stationary sprocket motor drive means for driving said second belt assembly; and
   third belt drive means coupled to said transport means for causing said accessor means to travel in said third direction, said third belt drive means including a third perforated belt assembly coupled to said transport means and third stationary sprocket motor drive means for driving said third belt assembly;
   wherein said first, second, and third belt drive means are cooperatively actuated to cause said transport means to transport said accessor means to access a magnetic tape at one of said locations of said cassette storage and utilization apparatus and to transport it to the other of said locations 2. The invention of claim 1 wherein said first, second and third belt assemblies comprise high yield, stainless steel material, respectively.

3. The invention of claim 1 wherein said first, second and third motor drive means include first, second and third brushless direct current motors, respectively.

4. The invention of claim 1 wherein said transport means includes: (a) spaced, parallel upper and lower rails located adjacent to said magnetic tape cassette storage and utilization apparatus; (b) upper and lower carriages mounted on said upper and lower rails, respectively, for travel in said first direction; and
   wherein said first belt assembly of said first belt means includes upper and lower perforated belts respectively coupled to said upper and lower carriages and wherein said first motor drive means drives said upper and lower belts in synchronism.

5. The invention of claim 4 wherein said first motor drive means includes an upper stationary motor for driving said upper belt and a lower stationary motor for driving said lower belt.

6. The invention of claim 4 wherein said transport means further includes vertical rail means connected between said upper and lower carriages and an accessor platform mounted on said vertical rail means for travel in said second direction; and wherein said second belt drive means is coupled to said accessor platform to drive said platform in said second direction.

7. The invention of claim 6 wherein said transport means further includes means for mounting said accessor means on said accessor platform for travel in said third direction; and wherein said third belt drive means is coupled to said mounting means to drive said accessor means in said third direction.

* * * * *